United States Patent
Cho

(10) Patent No.: US 6,637,542 B2
(45) Date of Patent: Oct. 28, 2003

(54) POWER STEERING SYSTEM WITH NOISE REDUCTION

(75) Inventor: Young-Gyun Cho, Seoul (KR)

(73) Assignee: Kia Motors Corporation, Seoul (KR)

( * ) Notice: Subject to any disclaimer, the term of this patent is extended or adjusted under 35 U.S.C. 154(b) by 81 days.

(21) Appl. No.: 10/029,962

(22) Filed: Dec. 31, 2001

(65) Prior Publication Data

US 2003/0070864 A1 Apr. 17, 2003

(30) Foreign Application Priority Data

Oct. 17, 2001 (KR) ........................... 2001-64099

(51) Int. Cl.[7] ................................................. B62D 5/06
(52) U.S. Cl. ......................... 180/441; 180/439; 138/44
(58) Field of Search .............................. 180/417, 428, 180/439, 441; 138/37, 40, 44

(56) References Cited

U.S. PATENT DOCUMENTS

| | | | |
|---|---|---|---|
| 4,285,534 A | * | 8/1981 | Katayama et al. ............. 138/44 |
| 4,762,150 A | * | 8/1988 | Kokuryu ........................ 138/44 |
| 5,184,693 A | * | 2/1993 | Miller .......................... 180/423 |
| 5,531,287 A |   | 7/1996 | Sherman |
| 5,983,946 A | * | 11/1999 | Chen et al. .................... 138/40 |
| 6,119,728 A | * | 9/2000 | Seidel-Peschmann et al. ........ 138/44 |

* cited by examiner

*Primary Examiner*—Lesley D. Morris
*Assistant Examiner*—Matthew Luby
(74) *Attorney, Agent, or Firm*—Birch, Stewart, Kolasch & Birch, LLP

(57) ABSTRACT

A power steering system for automotive vehicles has a construction for reducing noise generated due to pressure change of hydraulic fluid in the power steering system. In the power steering system, an orifice tube is disposed in a joint portion between the first return tube and the second return tube. The orifice tube includes an orifice tube body and a flange, the orifice tube body has an outer diameter equal to an inner diameter of the first return tube so that the orifice tube body can be inserted in the first return tube. The flange has an outer diameter equal to an inner diameter of the second return tube so that the flange can be inserted in the second return tube. The orifice tube has an orifice formed through the orifice tube body and the flange, which has an inner diameter smaller than the inner diameters of the first and second return tubes, so as to control pressure and speed of the hydraulic fluid flowing through the orifice from the first return tube to the second return tube, thereby reducing noise.

4 Claims, 2 Drawing Sheets

POWER STEERING SYSTEM WITH NOISE REDUCTION

BACKGROUND OF THE INVENTION

1. Field of the Invention

The present invention relates to a power steering system for automotive vehicles, and more particularly to a construction for reducing noise generated due to pressure change of hydraulic fluid in a power steering system.

2. Description of the Prior Art

As generally known in the art, a power steering system is a system for amplifying an operating force of a driver by means of a hydraulic pump, thereby enabling the driver to easily steer an automobile even with a relatively small force.

U.S. Pat. No. 5,531,287 issued to Sherman discloses an example of such a power steering system. In the U.S. power steering system, turning of the steering wheel is converted into linear movement of a rack through an engagement between the rack and a pinion, which together constitute a steering gear. Further, a control valve operated by the rotation of the steering wheel transfers hydraulic fluid, supplied from a source of hydraulic fluid, to a cylinder selectively through a pair of fluid pressure lines. As a result, a piston linearly reciprocates in the cylinder operatively connected to the rack, so as to operate tie rods connected to both ends of the piston, thereby carrying out a steering function. The hydraulic fluid returns from the control valve to the source of hydraulic fluid through a return line.

While an automobile is driven, noise may be generated due to vibration of a steering gear according to road conditions. This noise is the so-called "rattle sound" and is more severe especially when an automobile travels on an unpaved road at a low speed. This is generated because the hydraulic pressure in a hydraulic line system is significantly changed while opening and closing the control valve is continuously repeated during a process where an external force from the road is transferred to the steering wheel through road wheels, a steering gear, and a steering column.

In order to reduce this noise, in the U.S. power steering system, a restriction device having an orifice, whose inner diameter is smaller than an inner diameter of a rigid return tube, is integrally formed on the end of the rigid return tube connected to a flexible return tube. The end of the rigid return tube has an inner fluid channel having a substantially conical shape, whose diameter gradually decreases from the maximum diameter of the rigid return tube to the inner diameter of the orifice. Therefore, the hydraulic fluid returning to the source of hydraulic fluid through the return line undergoes changes in its pressure and speed due to the change in the cross-sectional area of the flow while the hydraulic fluid passes the orifice, thereby reducing the noise.

In a power steering system and method employing an orifice provided at a fluid channel so as to reduce noise as described above, it has been known to be preferable that the cross-sectional area of the flow changes abruptly and largely between the orifice and the fluid channel. That is, the more abruptly the cross-sectional area of the flow changes, the better a turbulent flow happens and thereby the more noise is reduced.

However, in the case of the U.S. power steering system, since the end of the rigid return tube has a conical shape, the cross-sectional area of the flow gradually changes. Therefore, the effect of reducing noise is not so large.

Further, in the U.S. power steering system, the orifice is disposed closer to a power steering reservoir in the middle of the return line. Therefore, the orifice, which is means for reducing noise, is too far from the steering gear, which is the cause of the noise, to reduce noise generated while the hydraulic fluid travels from the control valve to the orifice, thereby deteriorating the effect of noise reduction.

SUMMARY OF THE INVENTION

Accordingly, the present invention has been made to solve the above-mentioned problems occurring in the prior art, and an object of the present invention is to provide a power steering system for automotive vehicles, which enables a cross-sectional area of the flow of hydraulic fluid returning through a return line to abruptly change, thereby significantly improving the effect of noise reduction.

It is another object of the present invention to provide a power steering system for automotive vehicles, in which an orifice for reducing noise is disposed adjacent to a source of the noise.

In order to accomplish this object, there is provided a power steering system for an automobile, the power steering system comprising: a steering gear including a pinion turned by a steering wheel and a rack engaged with the pinion; a hydraulic cylinder containing a piston operatively connected with the rack; a control valve for directing hydraulic fluid to the hydraulic cylinder selectively through first and second fluid lines; a source of hydraulic fluid for supplying pressurized hydraulic fluid; a pressure line for delivering the pressurized hydraulic fluid from the source of hydraulic fluid to the control valve; a return line for returning the hydraulic fluid from the control valve to the source of hydraulic fluid, the returning line including a first return tube made from a rigid material and a second return tube made from a flexible material, the first return tube having a first end connected with the control valve and a second end, the second return tube having a first end connected with the source of hydraulic fluid and a second end connected with the second end of the first return tube; and an orifice tube disposed in a joint portion between the first return tube and the second return tube, the orifice tube including an orifice tube body and a flange, the orifice tube body having an outer diameter equal to an inner diameter of the first return tube so that the orifice tube body can be inserted in the first return tube, the flange having an outer diameter equal to an inner diameter of the second return tube so that the flange can be inserted in the second return tube, the orifice tube having an orifice formed through the orifice tube body and the flange, the orifice having an inner diameter smaller than the inner diameters of the first and second return tubes, so as to control pressure and speed of the hydraulic fluid flowing through the orifice from the first return tube to the second return tube, thereby reducing noise.

It is preferred that the inner diameter of the first return tube has a value between 9.4 and 9.8 mm, the inner diameter of the second return tube has a value between 11.4 and 11.8 mm, and the inner diameter of the orifice has a value between 3.4 and 3.8 mm.

In accordance with another aspect of the present invention, the orifice tube may be disposed adjacent to the steering gear.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
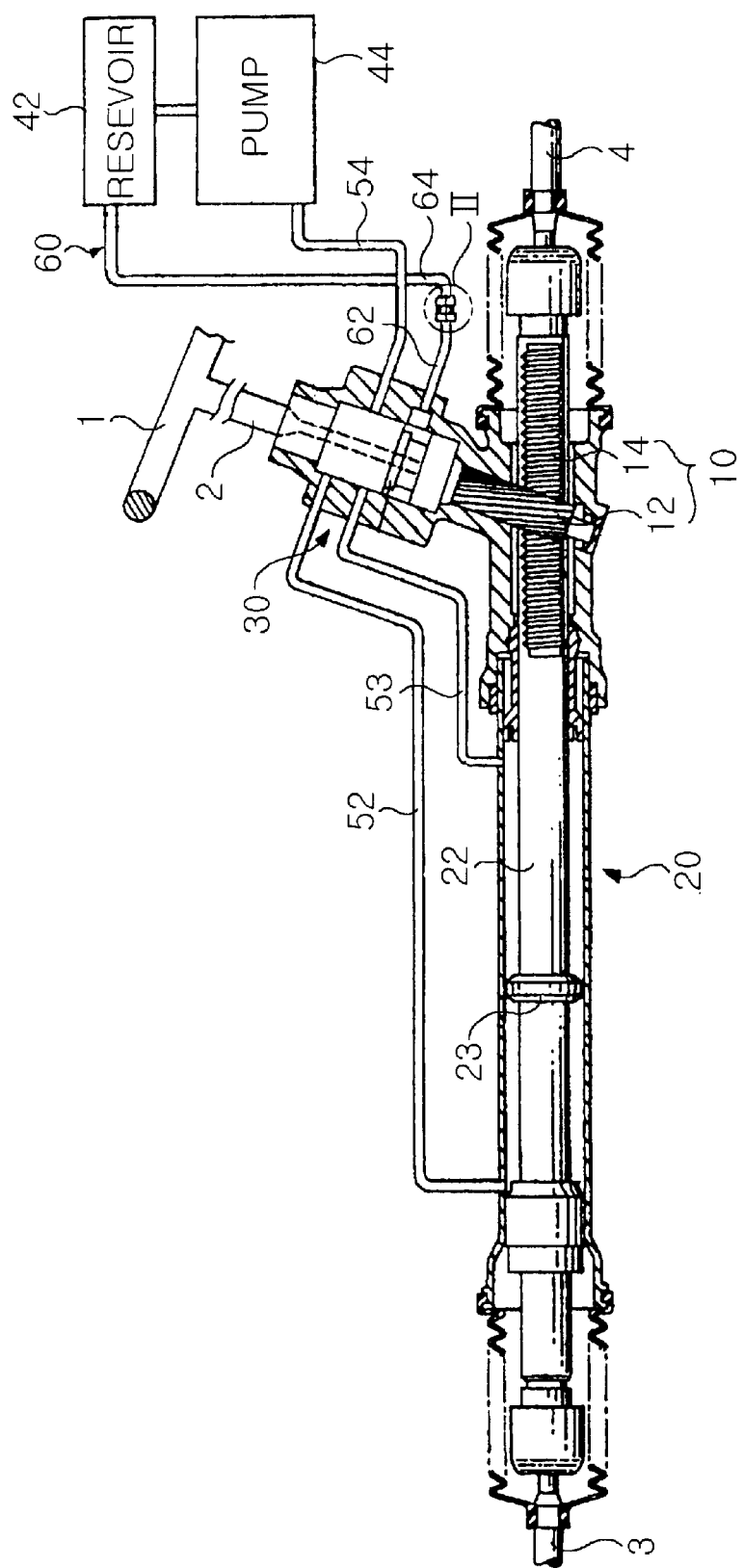
FIG. 1 is a sectional view of a power steering system according to an embodiment of the present invention.

FIG. 1 shows a power steering system according to an embodiment of the present invention. The power steering system according to an embodiment of the present invention includes a steering gear 10, a hydraulic cylinder 20, a control valve 30, a source of hydraulic fluid, various fluid lines, and an orifice tube 70.

The steering gear 10 includes a pinion 12 provided at a lower end of a steering column 2 so that it can be operated by a steering wheel 1, and a rack 14 engaged with the pinion 12. Turning of the steering wheel 1 is converted into linear movement of the rack 14 through the pinion 12.

A hydraulic cylinder 20 is disposed in parallel with the rack 14 of the steering gear 10, and a piston 22 in the hydraulic cylinder 20 is operatively connected with the rack 14. The piston 14 has extensions respectively extending out of the cylinder from both sides of the piston to be connected one by one with tie rods 3 and 4, each of which is assembled with a road wheel. An inner space of the cylinder 20 is partitioned into two chambers by a partitioning protrusion 23 of the piston 22, which communicate with the control valve respectively through fluid lines 52 and 53, which will be described later.

The control valve 30 is disposed at a portion of the steering column 2 above the pinion 12, and is connected to the hydraulic cylinder 20 through a pair of fluid lines 52 and 53 and to a source of hydraulic fluid through a pressure line 54 and a return line 60. Detailed construction and function of the control valve 30 will not be further described, since they are fully known in the field of the art relating to the present invention.

The source of hydraulic fluid includes a reservoir 42 for storing the hydraulic fluid, and a pump 44 for pressurizing the hydraulic fluid in the reservoir 42 to supply the hydraulic fluid to the control valve 30. The pump 44 and the control valve 30 are connected with each other through the pressure line 54, and the control valve 30 and the reservoir 42 are connected with each other through the return line 60.

Simultaneously when the turning of the steering wheel 1 is converted into a horizontal movement of the rack 14 in the steering gear 10, the control valve 30 is operated so that the hydraulic fluid supplied to the control valve 30 from the pump 44 is selectively supplied to the hydraulic cylinder 20 through the fluid line 54. As a result, the piston 22 moves in the same direction as the rack 14. The hydraulic fluid, which has returned to the control valve 30 from the cylinder 20, returns to the reservoir 42 through the return line 60.

Figure 2:
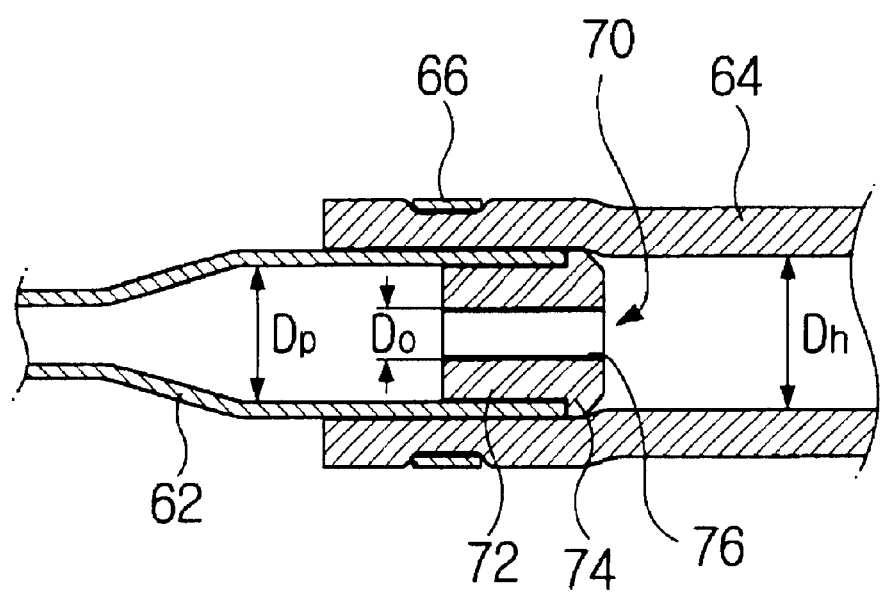
FIG. 2 is an enlarged sectional view of the encircled portion designated by II in FIG. 1.

In the meantime, the return line 60 has a first return tube 62 made from rigid material, the first end of which is connected to the control valve 30, and a second return tube 64 made from flexible material, the first end of which is connected to the reservoir. Further, as shown in FIG. 2, an orifice tube 70, which is an important feature of the present invention, is inserted in a joint portion between the first and second return tubes 62 and 64.

In more detailed description, the orifice tube includes an orifice tube body 72 and a flange 74. The orifice tube body 72 has an outer diameter equal to an inner diameter Dp of the first return tube 62 so that the orifice tube body 72 can be inserted in the first return tube 62, while the flange 74 has an outer diameter equal to an inner diameter Dh of the second return tube 64 so that the flange 74 can be inserted in the second return tube 64. Further, an orifice 76, which has an inner diameter smaller than the inner diameters Dp and Dh of the first and second return tubes 62 and 64, is formed extending through the orifice tube body 72 and the flange 74 along the center axis of the orifice tube 70, so that the first and second return tubes 62 and 64 communicate with each other. After the orifice tube body 72 of the orifice tube 70 is inserted into a second end of the first return tube 62, the second end of the first return tube 62 together with the flange 74 of the orifice tube 70 fitted in the second end is inserted into a second end of the second return tube 64. Thereafter, a flexible band 66 is fastened around the second end of the second return tube 64 surrounding the first end of the first return tube 62 in which the orifice tube 70 is fitted, so that the first and second return tubes 62 and 64 are completely joined together.

In this case, the inner diameter Dp of the first return tube 62 has a value between 9.4 and 9.8 mm and is preferably 9.6 mm, the inner diameter Dh of the second return tube 64 has a value between 11.4 and 11.8 mm and is preferably 11.6 mm, and the inner diameter Do of the orifice 76 has a value between 3.4 and 3.8 mm and is preferably 3.6 mm.

Therefore, when the hydraulic fluid passes through the orifice 76 of the orifice tube 70 from the first return tube 62 to the second return tube 64 while returning to the reservoir 42 from the control valve 30 through the return line 60, the cross-sectional area of the flow abruptly changes, so that pressure and speed of the hydraulic fluid change. As a result, noise generated by the hydraulic fluid returning through the return line 60 is largely reduced.

Further, the location of the orifice tube 70 on the return line 60, that is, the location of joint portion between the first and second return tubes 62 and 64 is designed to be adjacent to the steering gear 10. As described above, the closer to each other the steering gear 10 and the orifice tube 70 are located, the more the noise is reduced.

A power steering system according to an embodiment of the present invention as described above is advantageous in that noise is largely reduced since the cross-sectional area of the flow abruptly changes when the hydraulic fluid returning through the return line passes through the orifice of the orifice tube in the power steering system. Further, since a separate orifice tube for reducing noise is arranged in a power steering system of the present invention, not only the power steering system can be easily assembled, but also various orifice tubes having sectional areas of various sizes may be employed according to kinds of automobiles, so that the power steering system of the present invention can be adjusted according to the characteristics of the automobiles.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A power steering system for an automobile, the power steering system comprising:

a steering gear including a pinion turned by a steering wheel and a rack engaged with the pinion;

a hydraulic cylinder containing a piston operatively connected with the rack;

a control valve for directing hydraulic fluid to the hydraulic cylinder selectively through first and second fluid lines;

a source of hydraulic fluid for supplying pressurized hydraulic fluid;

a pressure line for delivering the pressurized hydraulic fluid from the source of hydraulic fluid to the control valve;

a return line for returning the hydraulic fluid from the control valve to the source of hydraulic fluid, the returning line including a first return tube made from a rigid material and a second return tube made from a flexible material, the first return tube having a first end connected with the control valve and a second end, the second return tube having a first end connected with the source of hydraulic fluid and a second end connected with the second end of the first return tube; and an orifice tube disposed at a joint portion between the first return tube and the second return tube, the orifice tube including an orifice tube body and a flange, the orifice tube body having an outer diameter equal to an inner diameter of the first return tube so that the orifice tube body can be inserted in the first return tube, the flange having an outer diameter equal to an inner diameter of the second return tube so that the flange can be inserted in the second return tube, the orifice tube having an orifice formed through the orifice tube body and the flange, the orifice having an inner diameter smaller than the inner diameters of the first and second return tubes, so as to control pressure and speed of the hydraulic fluid flowing through the orifice from the first return tube to the second return tube, thereby reducing noise.

2. A power steering system for an automobile as claimed in claim 1, wherein the inner diameter of the first return tube has a value between 9.4 and 9.8 mm, the inner diameter of the second return tube has a value between 11.4 and 11.8 mm, and the inner diameter of the orifice has a value between 3.4 and 3.8 mm.

3. A power steering system for an automobile as claimed in claim 2, wherein the orifice tube is disposed adjacent to the steering gear.

4. A power steering system for an automobile as claimed in claim 1, wherein the orifice tube is disposed adjacent to the steering gear.

\* \* \* \* \*